US012811126B2

(12) United States Patent
Chen

(10) Patent No.: US 12,811,126 B2
(45) Date of Patent: Nov. 24, 2026

(54) CONDUCTOR ELEMENT FOR A FILAMENT LAMP

(71) Applicant: SIGNIFY HOLDING B.V., Eindhoven (NL)

(72) Inventor: Li Xiong Chen, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/730,463

(22) PCT Filed: Jan. 18, 2023

(86) PCT No.: PCT/EP2023/051079
§ 371 (c)(1),
(2) Date: Jul. 19, 2024

(87) PCT Pub. No.: WO2023/139095
PCT Pub. Date: Jul. 27, 2023

(65) Prior Publication Data

US 2025/0132144 A1 Apr. 24, 2025

(30) Foreign Application Priority Data

Jan. 20, 2022 (WO) ................ PCT/CN2022/073032
Mar. 1, 2022 (EP) .................................... 22159481

(51) Int. Cl.
*H01K 1/18* (2006.01)
*H01K 1/16* (2006.01)
(Continued)

(52) U.S. Cl.
CPC ................ *H01K 1/18* (2013.01); *H01K 1/16* (2013.01); *H01K 3/06* (2013.01); *H01K 3/08* (2013.01); *H01K 5/00* (2013.01)

(58) Field of Classification Search
CPC .. H01K 1/18; H01K 1/16; H01K 3/06; H01K 3/08; H01K 3/00
See application file for complete search history.

(56) References Cited

U.S. PATENT DOCUMENTS 951,400 A * 3/1910 Knight ..................... H01K 1/18 313/271
1,457,239 A * 5/1923 Volpian .................... H01K 1/18 313/279

(Continued)

FOREIGN PATENT DOCUMENTS

CA 3013021 A1 8/2019
CN 204986487 U 1/2016

(Continued)

*Primary Examiner* — Abdulmajeed Aziz
*Assistant Examiner* — Nathaniel J Lee

(57) ABSTRACT

A filament lamp (10) comprising a conductor element (100) that connects to at least two filaments (15). The conductor element is ring-shaped and formed of a continuous length or piece of bent conductive wire. The conductor element comprises a plurality of protrusions (111, 112, . . . , 118) to which a respective filament is attached and/or electrically connected. The conductor element lies in a first plane (410). Each of the plurality of protrusions is configured to provide a surface to which a respective filament of the filament lamp is electrically connectable. The surface is inclined with respect to the first plane.

17 Claims, 4 Drawing Sheets

(51) Int. Cl.

| | |
|---|---|
| ***H01K 3/06*** | (2006.01) |
| ***H01K 3/08*** | (2006.01) |
| ***H01K 5/00*** | (2006.01) |

(56) References Cited

U.S. PATENT DOCUMENTS

| | | | | |
|---|---|---|---|---|
| 1,563,999 | A * | 12/1925 | Kiriak | H01K 1/18 174/50.54 |
| 2,254,362 | A * | 9/1941 | Fulp | H01K 3/06 445/27 |
| 11,118,738 | B1 | 9/2021 | Che et al. | |
| 2018/0080612 | A1 | 3/2018 | Haberkorn et al. | |
| 2018/0172218 | A1* | 6/2018 | Feit | F21K 9/232 |
| 2018/0245744 | A1 | 8/2018 | Li | |
| 2019/0032857 | A1* | 1/2019 | Cao | F21K 9/232 |
| 2019/0032858 | A1 | 1/2019 | Cao et al. | |

FOREIGN PATENT DOCUMENTS

| | | | |
|---|---|---|---|
| CN | 205424484 | U | 8/2016 |
| CN | 106015980 | A | 10/2016 |
| CN | 206600642 | U | 10/2017 |
| CN | 207584402 | U | 7/2018 |
| CN | 209026543 | U | 6/2019 |
| CN | 111649244 | A | 9/2020 |
| CN | 212029187 | U | 11/2020 |
| CN | 212390137 | U | 1/2021 |
| EP | 3296614 | A1 | 3/2018 |

* cited by examiner

CONDUCTOR ELEMENT FOR A FILAMENT LAMP

CROSS-REFERENCE TO PRIOR APPLICATIONS

This application is the U.S. National Phase application under 35 U.S.C. § 371 of International Application No. PCT/EP2023/051079, filed on Jan. 18, 2023, which claims the benefit of International Application No. PCT/CN2022/073032, filed on Jan. 20, 2022 and European Patent Application No. 22159481.5, filed on Mar. 1, 2022. These applications are hereby incorporated by reference herein.

FIELD OF THE INVENTION

The present invention relates to the field of lighting, and in particular, to filament lamps such as lightbulbs.

BACKGROUND OF THE INVENTION

There is an ongoing desire to improve artificial lighting. Filament lamps, such as lightbulbs, are used to provide artificial light in a wide variety of environments, such as in domestic, industrial and/or public settings.

Filament lamps currently on the market can be divided into at least three types: spiral, upright and crossing. A spiral filament lamp usually comprises a single filament that is arranged in a spiral or helical structure. An upright filament lamp comprises a plurality of filaments that are positioned vertically with respect to the filament lamp, so that they lie perpendicularly to a socket into which the filament lamp is connected. A crossing filament lamps comprises a plurality of filaments that are inclined within the filament lamp, so that they are inclined with respect to a socket into which the filament lamp is connected.

When a filament lamp comprises a plurality of filaments, it is common to configure the filament lamp so that it drives each filament simultaneously and with a same power. To this end, it is customary to connect corresponding ends of each filament to one another, so that corresponding ends can be driven simultaneously. Typically, this is performed using a set of electrical connectors that each connect a respective end of each filament to a common node. Alternatively, it is possible to provide a connector that connects a respective end of each filament to one another.

There is an ongoing desire to improve an ease of manufacturing filament lamps.

SUMMARY OF THE INVENTION

The invention is defined by the claims.

According to examples in accordance with an aspect of the invention, there is provided a filament lamp comprising at least one conductor element and at least two filaments, each conductor element being formed of a single, continuous length of bent conductive wire and comprising a substantially ring-shaped frame with a plurality of protrusions to which a respective filament of the filament lamp is attached to and/or electrically connected.

The proposed conductor element is able to provide an electrically conductive path between at least two filaments of the filament lamp. The conductor element may be used, for instance, to provide a same voltage or power to respective nodes/ends of different filaments, e.g. a ground voltage or power supply for driving each filament.

The proposed conductor element provides protrusions, which increase an ease of mounting or connecting filaments to the conductor element. A protrusion provides a sturdier surface against which a filament can be rested as it is mounted to the conductor element.

A filament lamp may, for instance, be a lightbulb comprising a transparent/translucent bulb that encases two or more filaments. A base or end cap of the lightbulb provides electrical connection to the interior of the bulb, as well as structural support. Each filament needs to be driven with power to emit light. The proposed conductor element can be used in such a lightbulb to connect (e.g. the ends of) two or more filaments together so that a same power can be simultaneously supplied to all of the filaments.

In the context of the present invention, a conductive wire is one that is electrically conductive, and can be formed of any suitably conductive material (e.g. metals), such as iron or copper, In some examples, each filament is an LED filament.

Optionally, the plurality of protrusions is formed by a loop of the bent conductive wire.

In some examples, the conductor element comprises a conductive link between each protrusion, each conductive link being a part of the continuous length of bent conductive wire, wherein a shape bounded by the conductive links is a regular polygon.

In some examples, each conductive link is substantially straight. By way of example only, a maximum deviation of each conductive link from a straight line may be no more than 10% of the total length of the conductive link. Other suitable examples for defining a substantially straight element will be apparent to the skilled person, e.g. an element may be considered straight if the person skilled in a manufacturing field would consider the element to be straight or effectively straight.

Optionally, each of the plurality of protrusions extends outwardly from the shape bounded by the conductive links. Less preferably, each of the plurality of protrusions may extend towards an interior of the shape bounded by the conductive links.

The regular polygon may be an octagon. However, other regular shapes would be readily apparent to the skilled person, and may depend upon the number of protrusions. Thus, when there are eight protrusions, the regular polygon may be an octagon. If there are five protrusions, the regular polygon may be a pentagon and so on. Thus, the regular shape may be a regular shape having as many sides as there are protrusions of the bent conductive wire.

The filament lamp may be configured wherein the conductor element lies in a first plane; and each of the plurality of protrusions is configured to provide a surface to which a respective filament of the filament lamp is electrically connectable, the surface being inclined with respect to the first plane.

In some examples, each of the plurality of protrusions is formed by a loop of the bent conductive wire; and for each loop, a second plane in which the loop lies is inclined with respect to the first plane. This thereby provides the surface, inclined with respect to the first plane, to which a respective filament of the filament lamp is electrically connectable. Optionally, for each loop, the plane in which the loop lies is not perpendicular to the first plane.

The conductive wire may be formed of iron, copper, an iron alloy or a copper alloy. Other suitably electrically conductive and mechanically supportive materials may be used and would be readily apparent to the skilled person.

The at least two filaments may comprise at least three filaments, each filament being attached and/or electrically connected to a respective protrusion of the conductor element.

The conductor element may provide a mechanical support for each filament.

In some examples, the conductor element lies in a first plane and each filament is inclined with respect to, and non-perpendicular to, the first plane. Inclining the filaments with respect to the plane in which the conductor element lies facilitates a reduction in height of the filament lamp, as the effective height of the filaments will be reduced.

There is also proposed a method for use in manufacturing a filament lamp comprising at least two filaments, the method comprising: obtaining a single, continuous length of conductive wire; and bending the single continuous length of conductive wire to form a conductor element comprising a substantial ring-shaped frame with a plurality of protrusions and for each protrusion: resting a respective filament onto the protrusion; and soldering the filament onto the protrusion to make electrical and mechanical connection.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
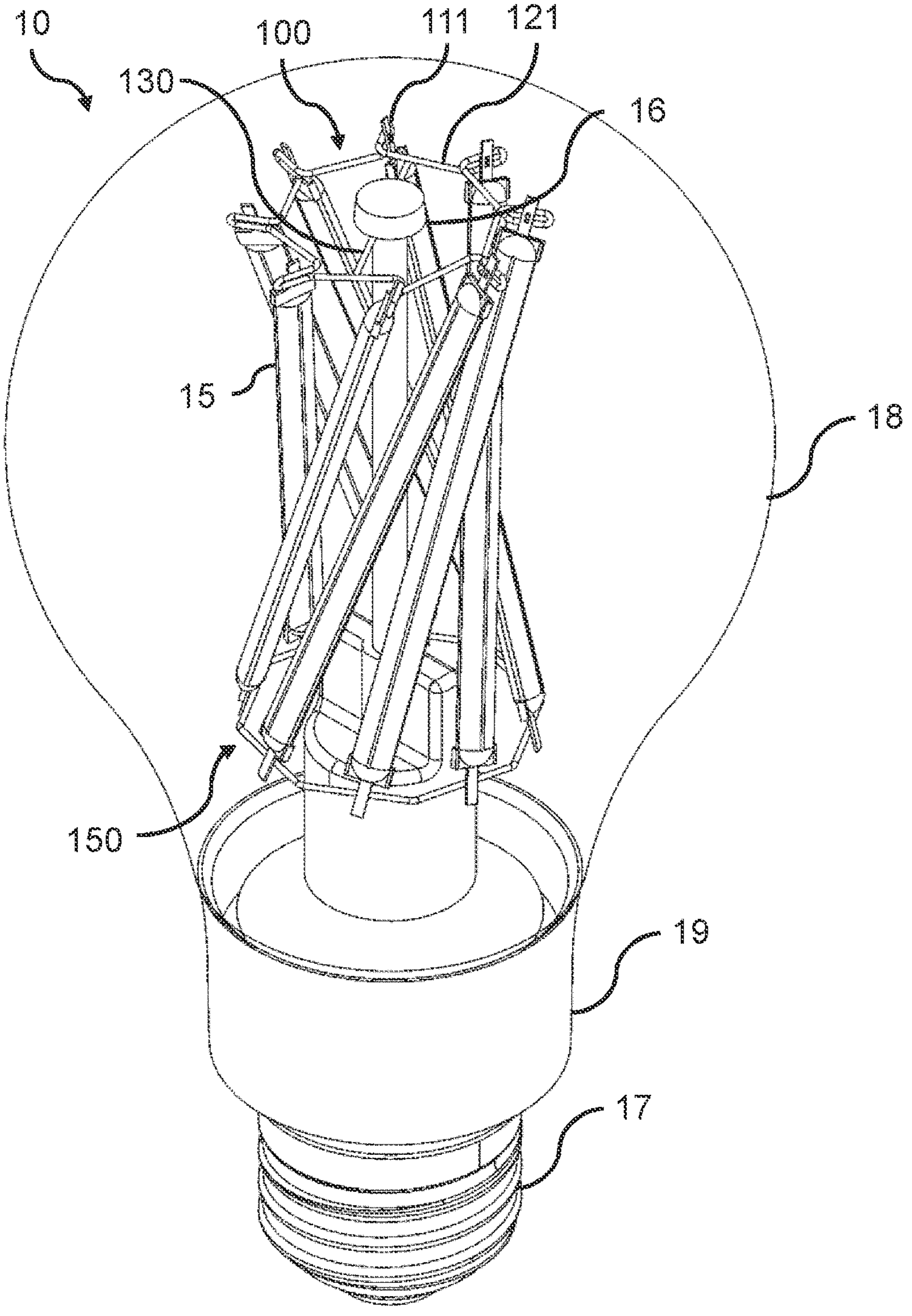
FIG. 1 provides a first view of a filament lamp according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a filament lamp comprising a conductor element that connects to at least two filaments. The conductor element is ring-shaped and formed of a continuous length or piece of bent conductive wire. The conductor elements comprises a plurality of protrusions to which a respective filament is attached and/or electrically connected.

Embodiments are based on the recognition that a single piece of wire can be appropriately bent or configured to provide protrusions against which filament(s) can be rested before/during attachment to the wire. This provides a more comfortable and convenient platform for connecting filaments to a same conductive element, for improving ease of connecting filaments to the conductive element, as well as reducing costs by using a single continuous use of material to form the conductive element.

Disclosed approaches may be employed in the manufacture of filament lamps, particularly those comprising a plurality of separate filaments or filament elements.

FIG. 1 illustrates a filament lamp 10 according to an embodiment.

The filament lamp 10 comprises a conductor element 100 and a plurality of filaments 15. The conductor element provides an electrical connection for each filament, specifically a first end of each filament 15, as well as a mechanical support for each filament within the lamp. Thus, each filament 15 is attached to and/or electrically connected to the conductor element 100.

The conductor element 100 thereby acts as a frame to which the filaments 15 of the lamp are mechanically and/or electrically connected.

As is known in the art, each filament 15 is configured to output or emit light responsive to electrical current passing through the filament, e.g. between a first and second end of the filament. Thus, a first and second end of each filament should be electrically connected or connectable to a power source. Each filament may, for instance, be an LED filament, although other forms of filament are known to the skilled person.

The conductor element 100 is mechanically attached to a central pillar 16. An electrical connector, e.g. a wire, is provided in/on the central pillar for providing an electrical connection to the conductor element, e.g. via a central connecting element 130.

The electrical connector of the central pillar 16 connects to a lamp base 17, sometimes labelled a lamp end cap, for connecting to an external power source and/or controller. The lamp base 17 may be formed of any conventional lightbulb or lamp base, such as an Edison screw lamp base (as illustrated) or a bayonet mount lamp base. In this way, the first end of each filament is connected to a part of the lamp base 17, which in turn connects to an external power source.

The filament lamp may comprise a second conductor element 150 which provides an electrical connection for the second end of each filament, different to the first end of each filament. The conductor element 100 and the second conductor element 150 may be (indirectly) electrically connected to different parts of the lamp base, so that opposite ends of the filament lamps are (indirectly) electrically connected to different parts of the lamp base. This provides an electrical path for external control and/or powering of the lamp. Of course, the filament lamp may comprise a driver or driver circuitry for driving the filaments. Appropriate driver circuitry would be apparent to the skilled person, and may comprise a converter (e.g. an AC-DC converter), a transformer, a smoothing capacitor, filtering circuitry and so on.

The second conductor element 150 may be formed from a continuous loop of conductive material. In other examples, the second conductor element 150 may be formed identically and/or in a similar manner as the later described conductor element 100.

The filament lamp may also comprise a mount 19, which mechanically supports other elements of the filament lamp.

For instance, the central pillar 16 may be mechanically fixed to the mount 19. The lamp base 17 may be connected to the mount 19, if present, and can aid in performing structural support of the overall lamp 10.

The filament lamp also comprises a bulb 18, for covering and protecting other elements of the filament lamp, specifically the filaments 15, the conductor element(s) 100, 150 and the central pillar 16. The bulb 18 may be formed of any suitable transparent/translucent material, such as glass or plastic, that permits the transit of light emitted by the filaments through the bulb. The bulb 18 may be clear or frosted. The bulb 18 is mechanically supported in/by the mount 19 (if present) and the lamp base 17.

The lamp base 17 thereby provides electrical connection to the interior of the bulb 18, as well as aiding in structural support.

The present disclosure provides an improved conductor element 100 for increasing an ease of manufacturing filament lamps, as well as improving the structural integrity of the filament lamp.

The proposed conductor element 100 is formed of a single, continuous or uninterrupted length of bent conductive wire. Thus, the conductor element 100 is formed of a single piece of material or wire. The conductor element 100 has a substantially ring-shaped frame (i.e. is shaped in the form of a ring or circle) and comprises a plurality of protrusions.

In the context of the present disclosure, a substantially ring-shaped frame indicates that the shape of the conductor element would be recognized as ring-like or resembling a ring to the skilled person in the manufacturing field, e.g. such that the conductor element is ring-shaped within the technical tolerance of the mechanism or technique used to prepare the ring-shaped frame.

A continuous element may be considered to be ring shaped if two ends of the element come into close proximity with one another and is generally shaped as a circle or (regular) polygon.

The conductive wire may be formed of any electrically conductive material that can be bent and can provide structural support to the filaments. Suitable examples include iron or copper, or any alloy thereof, e.g., steel or bronze.

In the illustrated example, the conductive wire comprises eight protrusions to which a respective filament is attached and/or electrically connected. However, in alternative embodiments, different numbers of protrusions may be provided for connecting various number of filaments. The number of protrusions is at least two. In some preferred examples, the number of protrusions is at least three.

The number of protrusions may be the same as the number of filaments that are to be connected to the conductor element 100, e.g. so that each filament is connectable to a respective protrusion. However, this is not essential, as more than one filament may be connected to a same protrusion in alternative examples. Moreover, it is not essential that a filament be connected to each protrusion of the conductor element, rather there may be additional protrusions to which no filament is connected.

In the illustrated example, each protrusion 121 is formed by a loop in the bent conductive wire. A loop provides a large and reliable surface area to which each filament can be secured, thereby increasing an ease and convenience for assembling or manufacturing the filament lamp.

The conductor element 100 also comprises a conductive link 121 between each protrusion 111. Each conductive may be substantially straight, and a shape bound by the conductive links may be a regular polygon. The vertices of the shape are represented or defined by the positions of the protrusions. In the illustrated example, the shape bound by the conductive links is an octagon, as there are eight protrusions 111. The number of sides to the shape bound by the conductive links may therefore depend upon the number of protrusions, e.g. be equal to the number of protrusions.

In the illustrated example, the protrusions are configured to extend outwardly from the shape bound by the conductive links 121. Alternatively, the protrusions may extend inwardly, towards a center of the shape bound by the conductive links 121. This latter approach is less preferred, as it makes assembly/attachment of any filaments onto each protrusion more difficult/fiddly and less convenient.

Figure 2:
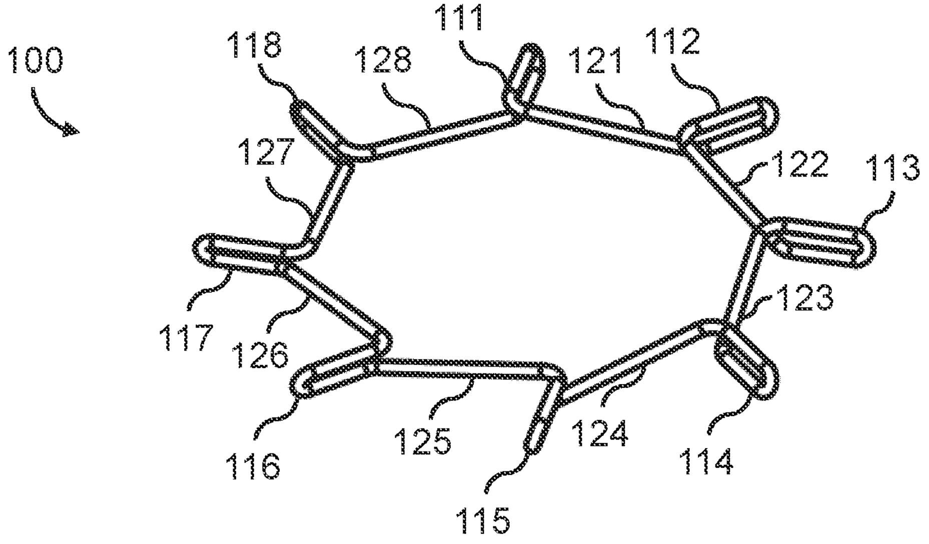
FIG. 2 provides a perspective view of a conductor element for use in a filament lamp.
Figure 3:
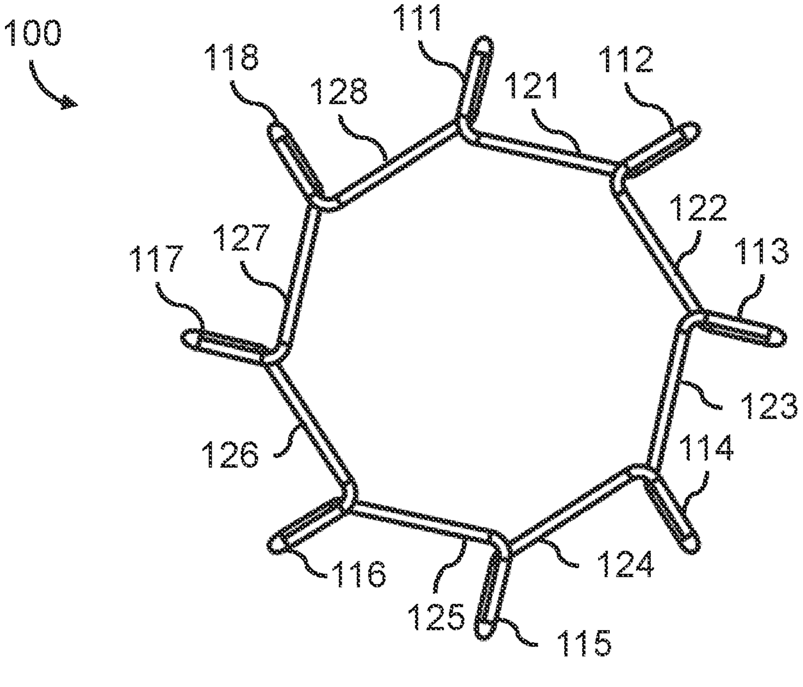
FIG. 3 provides a top-down view of the conductor element.
Figure 4:
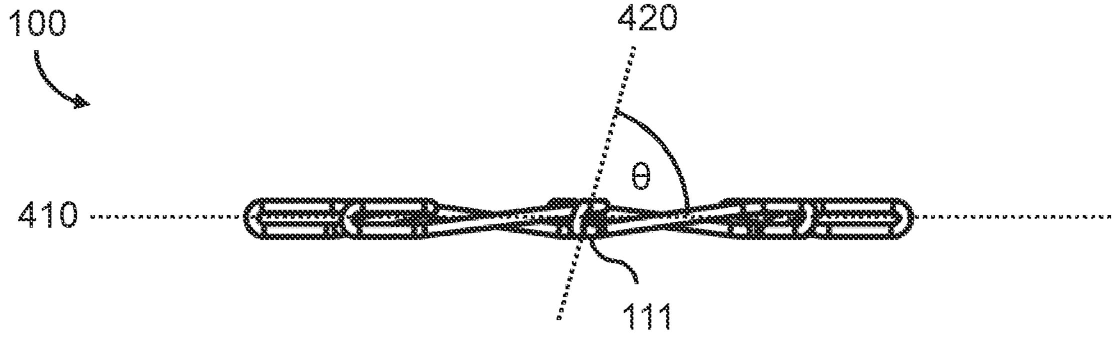
FIG. 4 provides a side view of the conductor element.

FIGS. 2 to 4 provide more detailed views of the proposed conductor element for the purposes of improved understanding. FIG. 2 provides an isometric view of the conductor element 100. FIG. 3 provides a top-side view of the conductor element 100. FIG. 4 provides a front-side or side-on view of the conductor element 100.

FIGS. 2 to 4 illustrates the conductor element 100 formed of a plurality of protrusions 111, 112, 113, 114, 115, 116, 117, 118. Each protrusion is interconnected by a conductive link 121, 122, 123, 124, 125, 126, 127, 128. It is possible for one of these conductive links to be omitted, e.g. so that a shape bound by the conductive link is open.

Thus, the conductor element 100 comprises a first protrusion 111, a second protrusion 112, a third protrusion 113, a fourth protrusion 114, a fifth protrusion 115, a sixth protrusion 116, a seventh protrusion 117 and an eighth protrusion 118. Other conductor elements may have fewer or more protrusions.

The conductor element 100 also comprises a first conductive link 121 (connecting the first 111 and second 112 protrusions), a second conductive link 122 (connecting the second 112 and third 113 protrusions), a third conductive link 123 (connecting the third 113 and fourth 114 protrusions), a fourth conductive link 124 (connecting the fourth 114 and fifth 115 protrusions), a fifth conductive link 125 (connecting the fifth 115 and sixth 116 protrusions), a sixth conductive link 126 (connecting the sixth 116 and seventh 117 protrusions), an seventh conductive link 127 (connecting the seventh 117 and eighth 118 protrusions) and an eighth conductive link 128 (connecting the eighth 118 and first 111 protrusions). The eighth conductive link may be omitted in some examples.

Other conductor elements may comprise fewer or more conductive links, e.g. depending upon whether the conductor element has a different number of protrusions. In any such embodiments, a conductive link connecting the first and last protrusion may be present or absent.

The proposed conductive element improves an ease of mounting or connecting filaments to a conductive element. In particular, the protrusions provide a base or platform against which a filament can be rested before/during attachment, e.g. soldering, of the filament to the conductive element. Thus, the dedicated protrusions increase an ease of soldering or otherwise connecting any filaments to the conductor element.

Thus, connecting a filament to a protrusion can be readily achieved by resting the filament on a protrusion, and then attaching the filament to the protrusion using solder or other connection means (e.g. wrapping wire). The use of a protrusion facilitates ease of manufacturing the filament lamp by providing a place to rest or brace the filament before/during soldering.

The use of a single continuous length of bent conductive wire decreases material cost and manufacturing complexity, thereby improving an efficiency of manufacturing the filament lamp.

Figure 5:
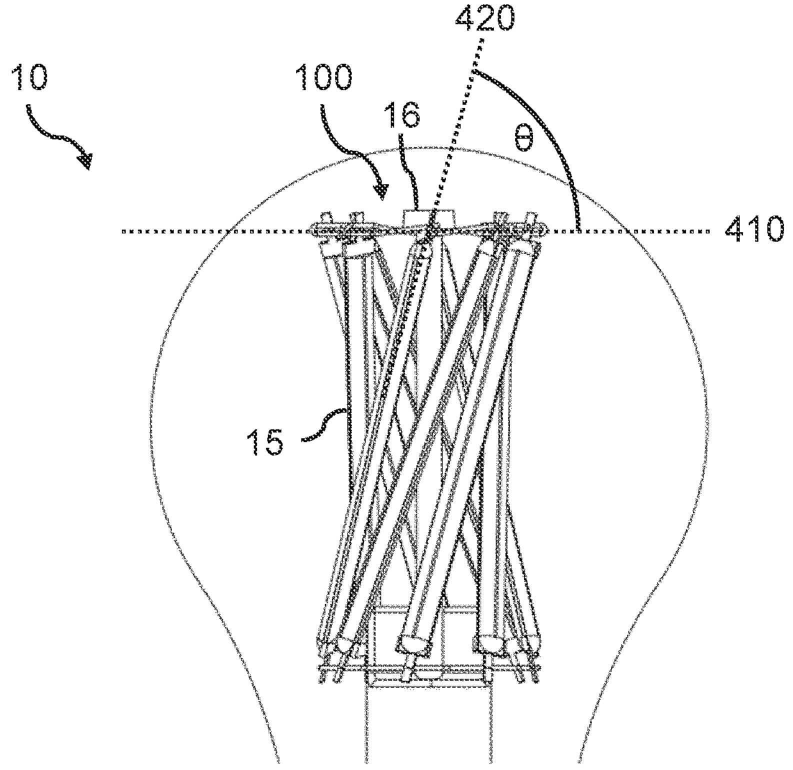
FIG. 5 provides a partial view of the filament lamp.

FIGS. 4 and 5 illustrate further concepts proposed by the present disclosure. As previously noted, FIG. 4 provides a front-side or side-on view of the conductor element 100. FIG. 5 provides a partial side-on view of the filament lamp 10.

The conductor element may be configured to lie, e.g. substantially, in a first plane 410. The first plane 410 may be substantially perpendicular to the central column 16. Each protrusion 111 of the conductor element may be configured to provide a surface to which filament 15 of the filament lamp 10 is attached and/or electrically connected. For each protrusion, this surface may be inclined with respect to the first plane. In other words, for each protrusion, a plane 420 (which can be labelled a second plane 420) in which the surface of the conductor element to which a filament of the filament lamp is attached and/or electrically connected may be inclined, at a non-zero angle and preferably non-perpendicularly, with respect to the first plane 410.

In this way, each filament 15 may be inclined with respect to, and preferably non-perpendicular to, the first plane 410.

To provide this surface, each protrusion may be formed of a loop of conductive wire. For each loop, the (second) plane 420 in which the loop lies is inclined with respect to the first plane 410. This provides an inclined surface to which a filament 15 of the filament lamp is attached and/or electrically connected.

As a further example, a filament may be directly attached to two sections of the loop of conductive wire, the two sections being separated and connected by a further section to which the filament is not directly attached. The two sections to which the filament is directly attached may be substantially parallel to one another. The two sections provide the surface to which the filament is directly attached and/or electrically connected. A (second) plane 420 in which the two sections lie is inclined with respect to the first plane 410, to thereby provide an inclined surface for the filament. This can be achieved by configuring the loop of the protrusion so that two sections are offset from one another with respect to the first plane 410 (i.e. have different projected positions on the first plane 410).

Preferably, for each protrusion, the second plane 420 is not perpendicular to the first plane 410. Thus, the angle θ between the first plane 410 and the second plane 420 may be non-zero and not equal to 90°. The angle θ may represent the smallest angle between the first 410 and second 420 planes from a side-on perspective.

Providing, for each protrusion, a second plane 420 for attaching the filament that is inclined and non-perpendicular with respect to the first plane 410 in which the conductor element 100 lies means that the filaments 15 are arranged in a crossing structure (i.e. the filaments are also inclined with respect to the first plane 410). This can help reduce illumination artefacts and provide more uniform illumination, compared to embodiments in which the filaments are arranged to be perpendicular to the conductor element 100. Inclining the second plane 420 and therefore filaments 15 with respect to the first plane 410 in which the conductor element lies facilitates a reduction in height of the filament lamp 10, as the effective height of the filaments 15 (i.e. maximum distance from the lamp base) will be reduced.

Approaches for manufacturing a filament lamp 10 as previously described would be readily apparent to the skilled person. Nonetheless, for the sake of completeness, one embodiment for manufacturing a filament lamp 10 is hereafter described.

Figure 6:
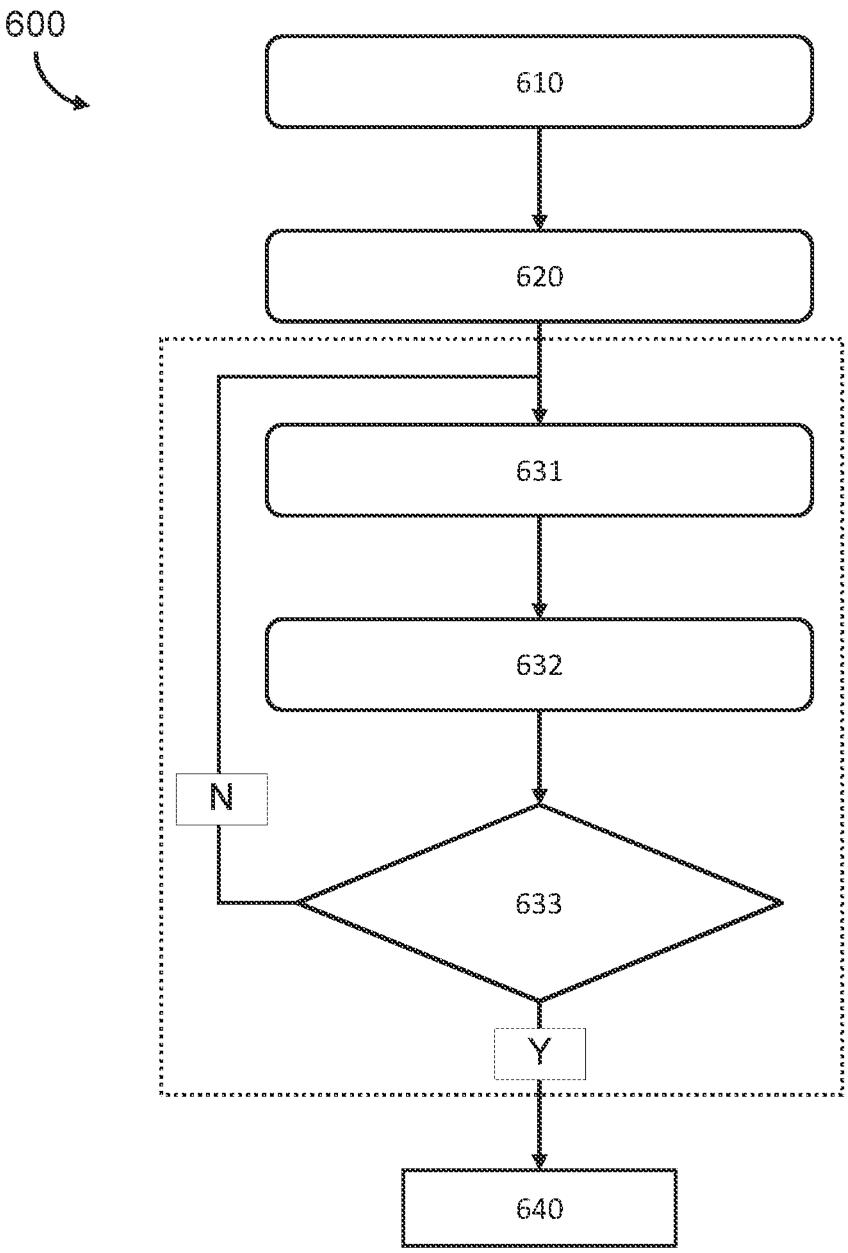
FIG. 6 is a flowchart illustrating a method for use in manufacturing a filament lamp.

FIG. 6 illustrates a method 600 for use in manufacturing a filament lamp comprising at least two filaments. The method 600 may form part of a larger procedure for manufacturing the filament.

The method comprises a step 610 of obtaining a single, continuous length of conductive wire.

The method then moves to a step 620 of bending the single continuous length of conductive wire to form a conductor element comprising a substantial ring-shaped frame with at least one protrusion. Forming the at least one protrusion may comprise creating one or more loops in the ring shaped frame, that extend outwardly from a center of the ring-shaped frame, each loop acting as a protrusion.

The method 600 then performs a process 630 of, for each protrusion, resting 631 a respective filament onto the protrusion; and soldering 632 or otherwise fixing the filament onto the protrusion to make electrical and mechanical connection between the protrusion and the filament.

Steps 631 and 632 may be repeated for all protrusions of the conductor element. This may be checked in a determination step 633. If not all protrusions have been processed, the method reverts back to step 631 for processing of that protrusion. Otherwise, the method moves to termination step 640 and ends.

Of course, there may be additional protrusions to which no filaments are mounted. Thus, step 633 may comprise determining whether all protrusions to which a filament is to be fixed have undergone steps 631 and 632.

In some examples, steps 631 and 632 may be performed more than once for one or more of the protrusions, so that a single protrusion may be attached to a plurality of filaments.

Additional steps for completing or initiating the manufacture a filament lamp would be apparent to the skilled person, e.g. providing the mount base, the mount, the bulb, the second conductor element and connecting the elements appropriately. These processes may make use of conventional and/or otherwise known mechanisms for manufacturing parts of the filament lamp.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A filament lamp comprising:

a lamp base;

at least one conductor element, each of the at least one conductor element being formed of a single, continuous length of bent conductive wire and having a substantially ring-shaped frame with a plurality of protrusions formed thereon, each of the plurality of protrusions being formed by a loop of the bent conductive wire; and at least two filaments, each of the at least two filaments being attached to and/or electrically connected to a corresponding one of the plurality of protrusions at an end of the filament lamp opposite the lamp base;

wherein the conductor element lies in a first plane, each of the plurality of protrusions is configured to provide a surface to which a respective filament is electrically connectable, the surface of each of the plurality of protrusions is inclined with respect to the first plane, each of the plurality of protrusions has a second plane in which the corresponding loop lies, and the second plane is inclined with respect to the first plane at a non-zero angle that is not equal to 90 degrees.

2. The filament lamp of claim 1, wherein the conductor element comprises a conductive link between each protrusion, each conductive link being a part of the continuous length of bent conductive wire, wherein a shape bounded by the conductive links is a regular polygon.

3. The filament lamp of claim 2, wherein each conductive link is substantially straight.

4. The filament lamp of claim 2, wherein each of the plurality of protrusions extends outwardly from the shape bounded by the conductive links.

5. The filament lamp of claim 2, wherein each of the plurality of protrusions extends towards an interior of the shape bounded by the conductive links.

6. The filament lamp of claim 2, wherein the regular polygon is an octagon.

7. The filament lamp of claim 1, wherein each of the plurality of protrusions is formed by a loop of the bent conductive wire; and for each loop, the second plane in which the loop lies is inclined with respect to the first plane to thereby provide the surface, inclined with respect to the first plane, to which a respective filament of the filament lamp is electrically connectable.

8. The filament lamp of claim 1, wherein the conductive wire is formed of iron, copper, an iron alloy or a copper alloy.

9. The filament lamp of claim 1, wherein the at least two filaments comprise at least three filaments, each filament being attached and/or electrically connected to a respective protrusion of the conductor element.

10. The filament lamp of claim 9, wherein the conductor element provides a mechanical support for each filament.

11. The filament lamp of claim 9, wherein the conductor element lies in a first plane; and each filament is inclined with respect to, and non-perpendicular to, the first plane.

12. The filament lamp of claim 1, wherein, for each of the plurality of protrusions, the loop of the bent conductive wire comprises two substantially parallel sections and an intervening section connecting the two substantially parallel sections, and each of the at least two filaments is attached to and/or electrically connected to the respective two substantially parallel sections of the loop.

13. The filament lamp of claim 1, wherein each of the at least two filaments is an LED filament.

14. The filament lamp of claim 1, further comprising a second conductor element electrically connected to a second end of each of the at least two filaments, the at least one conductor element and the second conductor element each being electrically connected to different parts of the lamp base.

15. The filament lamp of claim 1, further comprising a central pillar to which the at least one conductor element is mechanically attached, an electrical connection to the at least one conductor element being provided through the central pillar.

16. The filament lamp of claim 15, wherein the first plane in which the at least one conductor element lies is substantially perpendicular to the central pillar.

17. A method for use in manufacturing a filament lamp having at least two filaments and a lamp base, the method comprising:

obtaining a single, continuous length of conductive wire; and bending the single continuous length of conductive wire to form a conductor element comprising a substantial ring-shaped frame with a plurality of protrusions, each of the plurality of protrusions being formed by a loop of the bent conductive wire, the conductor element lying in a first plane, each of the plurality of protrusions providing a surface being inclined with respect to the first plane, each of the plurality of protrusions having a second plane in which the corresponding loop lies, the second plane being inclined with respect to the first plane at a non-zero angle that is not equal to 90 degrees; and for each protrusion:

resting a respective filament onto the surface of the protrusion at an end of the filament lamp opposite the lamp base; and soldering the filament onto the surface of the protrusion to make electrical and mechanical connection.

* * * * *